United States Patent [19]
Rehman

[11] Patent Number: 6,019,828
[45] Date of Patent: Feb. 1, 2000

[54] INK COMPOSITIONS HAVING SUPERIOR SMEARFASTNESS AND REDUCED SMUDGING AND BLOT DRY TIME

[75] Inventor: Zia Rehman, Corvallis, Oreg.

[73] Assignee: Hewlett-Packard Company, Palo Alto, Calif.

[21] Appl. No.: 09/239,503

[22] Filed: Jan. 28, 1999

[51] Int. Cl.$^7$ .................................................. C09D 11/02
[52] U.S. Cl. ...................................... 106/31.58; 106/31.86
[58] Field of Search ............................... 106/31.58, 31.86

[56] References Cited

U.S. PATENT DOCUMENTS

| | | | |
|---|---|---|---|
| 4,381,946 | 5/1983 | Uehara et al. | 106/31.58 |
| 5,141,556 | 8/1992 | Matrick | 106/31.58 |
| 5,389,132 | 2/1995 | Davulcu et al. | 106/31.58 |
| 5,766,327 | 6/1998 | Maze | 106/31.58 |
| 5,891,232 | 4/1999 | Moffatt et al. | 106/31.89 |

FOREIGN PATENT DOCUMENTS

| | | | |
|---|---|---|---|
| 0618278A2 | 10/1994 | European Pat. Off. | C09D 11/00 |
| 0643113A1 | 3/1995 | European Pat. Off. | C09D 11/00 |
| 0692527A2 | 1/1996 | European Pat. Off. | C09D 11/00 |
| 0712912A2 | 5/1996 | European Pat. Off. | C09D 11/00 |
| 0761783A2 | 3/1997 | European Pat. Off. | C09D 11/02 |

*Primary Examiner*—Helene Klemanski
*Attorney, Agent, or Firm*—Michael D. Jones

[57] ABSTRACT

A solvent system has been found which improves the blotting time smearfastness and smudge for ink-jet inks. Two solvents work in conjunction with each other: 2-methyl-1,3-propanediol and methyl pentanediol. These two solvents work in combination to improve printability of inks, especially pigment-bases inks that contain latex polymers. Such ink-jet inks also include typical vehicle adjuncts.

17 Claims, No Drawings

INK COMPOSITIONS HAVING SUPERIOR SMEARFASTNESS AND REDUCED SMUDGING AND BLOT DRY TIME

TECHNICAL FIELD

The present invention relates to ink-jet inks employed in ink-jet printing. In particular, this invention relates to an ink system that utilizes the addition of specific organic solvents to the ink. These solvents reduce, and in some cases even eliminate, smudging and provide increased smearfastness and blot drying time.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which expels ink through the nozzle toward the print medium. In this way, firing of a plurality of such resistor elements in a particular order in a given primitive forms alphanumeric characters, performs area-fill, and provides other print capabilities on the medium.

Many ink-jet inks, when printed in various colors or in black on bond paper, copier paper, and other media, can lead to smudge and smearing. Smearing occurs as the still wet or damp ink is touched by something while on the surface of the paper being printed. Smudging is generally associated with a person brushing against or touching the ink while damp. The ink is invariably "smudged" by the touching and leaves traces elsewhere on the page and on the person who touched it.

Prior solutions to smear and smudge have largely involved the use of oxidative drying with the help of catalysts. However, print quality, drop ejection, and long term storage are also important; hence, alternate smudge and smear control mechanisms are needed.

While each of the above has produced varying degrees of success, a need still remains for ink compositions for use in ink-jet printing which do not evidence smearing or smudging, as defined herein, when printed on plain papers, and yet which possess relatively long shelf life and other desirable properties of such inks.

DISCLOSURE OF THE INVENTION

The present invention provides ink compositions that are particularly suitable for, but are not limited to, color ink-jet printing on various print media. The ink compositions of the present invention provide superior smudge resistance, smearfastness, and decreased blot dry time without sacrificing other, important ink composition characteristics.

One embodiment of an ink composition according to the instant invention comprises one or more colorants and an organic solvent comprising a combination of methyl pentanediols and 2-methyl-1,3-propanediol. A particularly preferred methyl pentanediol is 2-methyl-2,4-pentanediol, also known a hexylene glycol. Other components commonly found in ink-jet ink compositions, such as biocides, surfactants and pH buffers, also may be added the ink compositions of the instant invention.

BEST MODE FOR CARRYING OUT THE INVENTION

The instant invention concerns ink compositions for use preferably, but not necessarily, with thermal ink-jet printers. The specially formulated ink compositions avoid print quality problems normally associated with slow ink drying time, e.g., smear, smudging, and blotting dry time.

The ink compositions of the present invention may be used to print images on a wide variety of materials, which are referred to herein as "print media," "media," or "substrates," including ordinary cellulosic paper and other substrates such as fibrous and resinous sheets. Film materials, non-porous transparent polyester films, and similar materials that are difficult to mark also can be used as print media for the present ink compositions.

The purity of all components used in the present ink compositions is that employed in normal commercial practice for forming ink compositions, particularly those ink compositions developed for thermal ink-jet printers.

The concentration of methyl pentanediol will be from about 0.05 wt % to about 3 wt % of the ink composition. The concentration of 2-methyl-1,3-propanediol will be from about 0.05 wt % to about 10 wt % of the ink composition.

Preferably, ink compositions herein include about 2 wt % to about 7 wt % of the 2-methyl-1,3-propanediol in combination with from about 0.5 wt % to about 2 wt % of the methyl pentanediol. Excellent results are achieved when the ink compositions herein include about 3 wt % to about 6 wt % of the 2-methyl-1,3-propanediol in combination with from about 0.5 wt % to about 1.5 wt % of the methyl pentanediol. Best results appear to be achieved when the methyl pentanediol is 2-methyl-2,4-pentandiol.

Colorants

It is well known in the art that one may use a wide range of water-soluble dyes in printing inks. For example, azo, methine, triaryl, anthracene, phthalocyanine, xanthine, oxazine, and mix dyes can be used.

A wide range of dyes are available: the dye may be black or colored dyes. The term "water-soluble" as used herein, refers to dyes whose solubility limit in water is sufficiently high so as to produce desired color saturation of printed images.

Pigments, also well known in the art, can also be utilized. The pigments can be combined with a suitable dispersant or be self-dispersing.

A wide variety of organic and inorganic pigments, alone or in combination may be selected to make the ink. The term "pigment" as used herein means an insoluble colorant. The pigment particles are sufficiently small to permit free flow of the ink through the ink-jet printing device. Especially at the ejecting nozzles that usually have a diameter ranging from 10 micron to 50 micron. The particle size also has an influence on the pigment dispersion stability, which is critical throughout the life of the ink. It is also desirable to use small particles for maximum color strength and gloss. The range of useful particle size is approximately 0.0005 to 15 micron.

Self-Dispersing Pigment

In one approach, the colorant employed in the ink is a self-dispersing pigment. Such pigments suitable for use herein include all chemically modified water-dispersible, pigments known for use in ink-jet printing. These chemical modifications impart water-dispersiblity to the pigment precursors that encompass all organic pigments.

For self-dispersibility or water solubility, the pigments herein are modified by the addition of one or more organic groups comprising at least one aromatic group or a C1–C12 alkyl group and at least one ionic group or ionizable group. The ionizable group is one that forms its ionic groups in the aqueous medium. The ionic group may be anionic or cationic. The aromatic groups may be further substituted or unsubstituted. Examples include phenyl or napthyl groups and the ionic group is sulfonic acid, sulfonic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid and metanilic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

The following pigments are useful in the practice of this invention; however, this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700, Cab-O-Jet® 200 and Cab-O-Jet® 300. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from DuPont.

In another embodiment herein the black pigment is dispersed in the ink composition with the aid of a dispersing agent. Such black pigments include any black pigment that is dispersed with a dispersant having an anionic functionality, for example, the Joncryl polymers available from S.C. Johnson Polymer (Racine, Wis.). Of course, any other dispersant exhibiting anionic charges may be employed in the practice of this invention. For a more complete discussion of black pigments and anionic dispersants see U.S. Pat. No. 5,181,045 and U.S. application, Ser. No. 08/567,974, recently issued.

The following color pigments are useful in the practice of this invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite Rubine 4BL, Monastral® Magenta, Monastral® Scarlet, Monastral® Violet R, Monastral® Red B, and Monastral® Violet Maroon B. The following pigments are available from Degussa: Printex U, Printex V, Printex 140U, and Printex 140V. The following pigment is available from DuPont: Tipure® R-101. The following pigments are available from Heubach: Dalamar® Yellow YT-858-D and Heucophthal®D Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

Aqueous color dyes may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company.

Latex Polymers

Latex polymers, also termed "core/shell" polymers, are polymers having both hydrophilic and hydrophobic portions. Such polymers are primarily used in pigment-based ink to improve the smearfastness of the inks. In accordance with the present invention, the printability of inks optionally containing one or more latex polymers is improved by including the organic co-mixture of the two solvents disclosed herein.

The latex polymer for use herein is selected from the group consisting of $$[(A)_m(B)_n(C)_p(D)_q(E)_r]_x \qquad (I)$$

wherein A, B, C, D, and E are moieties as follows:

A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of said polymer (I) which, when homopolymerized to a solid state, has a $T_g$ greater than +25° C.;

C=at least one hydrophilic component comprising a water-soluble monomer;

D=at least one UV absorber;

E=at least one moiety having at least one highly polar functional group;

m=5 to 95 wt %;

n=5 to 95 wt %;

p=0 to 60 wt %;

q=0 to 50 wt %;

r=0 to 40 wt %;

m+n+p+q+r=100 wt %; and x=1 to 100,000; and

 (II)

wherein A, B, C, and E are moieties as described above, and where m, n, p, and r of formula (II) are as follows:

m=0 to 90 wt %, preferably 10 to 60 wt %, and more preferably from 15 to 50 wt %;

n=0 to 90 wt %, preferably 10 to 60 wt %, and more preferably from 15 to 50 wt %;

p=0 to 90 wt %, preferably 10 to 60 wt %, and more preferably from 15 to 50 wt %;

r=0.01 to 100 wt %, preferably 0.1 to 60 wt %, and more preferably 1 to 40 wt %;

m+n+p+r=100 wt %; and x=1 to 100,000 preferably 10 to 10,000, and more preferably 100 to 1,000; and mixtures thereof.

Preferably, the final $T_g$ of the polymers (I) is within the range of about −25° C. to +110° C., and more preferably, the final $T_g$ is within the range of about −15° C. to +90° C., and most preferably within the range of about −10° C. to +75° C.

The molecular weight (weight average) of polymer (I) is between about 1,000 and 2,000,000, preferably between about 5,000 and 500,000, and even more preferably between about 10,000 and 70,000.

Either the C moiety or the E moiety must be present in the polymers to provide a polymer having either a hydrophilic portion or a highly polar portion. Alternatively, one or more surfactants may be used in conjunction with polymer (I), whether in the presence or the absence of the C or E, or both, moieties. The surfactant(s) may be anionic, cationic, non-ionic, or zwitterionic.

For structure (II), preferably, either m or n is non-zero. The $T_g$ of the primer core/shell polymers is within the range of about −100° C. to +100° C., preferably within the range of about −25° C. to +25° C., and more preferably within the range of about 0° C. to +25° C.

The molecular weight (weight average) of polymer (II) is between about 100 and 2,000,000, preferably between about 1,000 and 500,000, and even more preferably between about 5,000 and 70,000.

Polymers of structure (I) are typically referred to as durable core/shell polymers; polymers of structure (II) are referred to as primer core/shell polymers, which also have a hydrophilic portion and a hydrophobic portion.

All concentrations herein are in weight percent, unless otherwise indicated. The purity of all components is that employed in normal commercial practice for ink-jet inks. All references are hereby incorporated by reference.

Ink-Jet Ink Vehicle

The ink compositions of this invention comprise the colorants, the combination of one or more methyl pentanediols and methyl propanediols, and the ink vehicle. For a discussion of inks and their properties, see *The Printing Manual*, 5$^{th}$ ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the colorant (about 0.001% to 10 wt %), one or more cosolvents (in addition to the methyl pentanediol and methyl propanediols herein) (0.01 to about 50 wt %), one or more water-soluble surfactants/amphiphiles (0 to about 40, preferably about 0.1 to about 5 wt %), one or more high molecular weight colloids (0 to about 3 wt %), and water (balance). Optionally, the ink may contain the latex core/shell polymer(s) described above, present in a amount of from about 0.005% to about 10% by wt of the ink composition, preferably from 0.1 to about 5%.

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, lactones, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1, 3-propanediol, diethylene glycol, 3-methoxybutanol, and 1,3-dimethyl-2-imidazolidinone, 3-methyl-1,5-pentanediol, 1,3-propanediol, 1,4-butanediol, 2,4-heptanediol, 2-methyl-1,3-pentanediol, 2-methylpentanoic acid, 2-ethyl-3-methyl-1,5-pentanediol, 2-ethyl-1,3-methyl-1,5-pentanediol, 2-ethyl-3-propylacrylic acid, 2-ethyl-hexanoic acid, and 3-ethoxyproponic acid. The cosolvent concentration may range from about 0.01 to about 50 wt %, with about 0.1 to 20 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Amphoteric surfactants such as substituted amine oxides are useful in the practice of this invention. Cationic surfactants such as protonated POE amines may also be used. U.S. Pat. No. 5,106,416, discloses more fully most of the surfactants listed above. The non-ionic amphiphiles/surfactants are more preferred than the ionic surfactants. Specific examples of amphiphiles/surfactants that are preferably employed in the practice of this invention include iso-hexadecyl ethylene oxide 20, SURFYNOL CT-111, TERGITOL 15-S-7, and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To further improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and polymers disclosed herein. The viscosity of the final ink composition is from about 0.8 to about 8 cPs, preferably from about 0.9 to about 4 cPs.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing include paper, textiles, wood, and plastic.

To further illustrate this invention, some practical illustrations are set forth.

These examples are illustrative only and in no way are to be construed to limit the invention to a particular described feature.

EXAMPLE 1

Ink compositions are as follows:

| Ingredient | A | B | C | D | E | F | G | H | I |
|---|---|---|---|---|---|---|---|---|---|
| LEG-1 | 4 | 4 | 4 | 4 | 4 | 4 | 3 | 3 | 3 |
| 2-pyrrolidinone | 6 | 8 | 5 | 10 | 8 | 8 | 5 | 5 | 5 |
| 2-methyl-2,4-pentanediol | 2 | 1.7 | 1.5 | 2 | 0.5 | 1 | 0.05 | 1.7 | 3 |
| 2-methyl-1,3-propanediol | 5 | 2 | 6 | 3 | 5 | 2 | 0.5 | 5 | 10 |
| Balance 47 polymer | 0.5 | 0.5 | 0.5 | 0.5 | 0.5 | 0.5 | 0.5 | 0.5 | 0.5 |
| Black Pigment | 2.7 | 3 | 3 | 3 | 3 | 3 | 2 | 2 | 2 |
| C/S Polymer | 4.5 | 3 | 5 | 3 | 0 | 0 | 0 | 0 | 0 |
| Primer polymer | 1 | 2 | 1 | 0 | 1 | 0 | 0 | 0 | 0 |
| Proxel GXL | 0.2 | 0.2 | 0.2 | 0.2 | 0.2 | 0.2 | 0.2 | 0.2 | 0.2 |

All ingredients are included as a wt % of the total composition.

Final pH of all compositions is 8.5, neutralized with NaOH, KOH, or LiOH.

LEG-1 is a surfactant—Liponics EG-1.

Black pigments useful herein are self-dispersing pigments available from Cabot.

Balance 47™ is available from ALCO Chemicals, a division of National Starch & Rubber Corp. and is neutralized with NaOH, KOH, or LiOH.

Proxel GXL™ is a biocide.

C/S Polymer is a core/shell polymer. See U.S. patent application Ser. No. 08/998,164, filed Dec. 24, 1997, entitled "Dual Encapsulation Technique for Preparing Inkjet Inks", incorporated herein by reference.

Primer Polymer is similar to the C/S polymer, but it has a lower molecular weight, high acid content and is readily soluble. It acts as a dispersant.

The ink compositions shown are compared with identical ink compositions except for the absence of 2-methyl-2,4-pentanediol and 2-methyl1,3-propanediol. In all cases, the ink compositions with the combination of 2-methyl-2,4-pentanediol and 2-methyl1,3-propanediol show superior blotting, smudge, and smear control versus the compositions without them.

What is claimed is:

1. An ink composition for ink-jet printing wherein said ink composition comprises a colorant, from about 0.05 wt % to about 10 wt % 2-methyl-1,3-propanediol, and from about 0.05 wt % to about 3 wt % of at least one methyl pentanediol.

2. The ink composition of claim 1 wherein the methyl pentanediol is 2-methyl-2,4-pentanediol.

3. The ink composition of claim 1 wherein the colorant is a self-dispersing pigment.

4. The ink composition of claim 3 wherein the ink composition further comprises an ink vehicle.

5. The ink composition of claim 4 wherein said vehicle comprises at least one latex polymer.

6. An ink composition comprising a colorant, 2-methyl-1,3-propanediol, at least one methyl pentanediol, an ink vehicle, and at least one latex polymer:

wherein said latex polymer is selected from the group consisting of $$[(A)_m(B)_n(C)_p(D)_q(E)_r]_x \qquad (I)$$

wherein A, B, C, D, and E are moieties as follows:
A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of said polymer (I) which, when homopolymerized to a solid state, has a $T_g$ greater than +25° C.;

C=at least one hydrophilic component comprising a water-soluble monomer;

D=at least one UV absorber;

E=at least one moiety having at least one highly polar functional group;

m=5 to 95 wt %;

n=5 to 95 wt %;

p=0 to 60 wt %;

q=0 to 50 wt %;

r=0 to 40 wt %;

m+n+p+q+r=100 wt %; and x=1 to 100,000;

$$[(A)_m(B)_n(C)_p(E)_r]_x \quad (II)$$

wherein A, B, C, and E are moieties as described above, and where m, n, p, and r of formula (II) are as follows:

m=0 to 90 wt %;

n=0 to 90 wt %;

p=0 to 90 wt %;

r=0.01 to 100 wt %;

m+n+p+r=100 wt %; and x=1 to 100,000; and mixtures thereof.

7. An improved ink-jet ink for ink-jet printing, said ink-jet ink comprising at least one self-dispersing pigment, an ink vehicle, and water, characterized in that said ink-jet ink further contains from about 0.05 wt % to about 10 wt % 2-methyl-1,3-propanediol and from about 0.05 wt % to about 3 wt % of methyl pentanediol.

8. The ink composition of claim 7 wherein the methyl pentanediol is 2-methyl-2,4-pentanediol.

9. The ink composition of claim 8 further comprising at least one latex polymer.

10. An ink composition comprising at least one self-dispersing pigment, an ink vehicle, and water, characterized in that said ink-jet ink further contains 2-methyl-1,3-propanediol, a methyl pentanediol, and at least one latex polymer, wherein said latex polymer is selected from the group consisting of:

$$[(A)_m(B)_n(C)_p(D)_q(E)_r]_x \quad (I)$$

wherein A, B, C, D, and E are moieties as follows:

A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of said polymer (I) which, when homopolymerized to a solid state, has a $T_g$ greater than +25° C.;

C=at least one hydrophilic component comprising a water-soluble monomer;

D=at least one UV absorber;

E=at least one moiety having at least one highly polar functional group;

m=5 to 95 wt %;

n=5 to 95 wt %;

p=0 to 60 wt %;

q=0 to 50 wt %;

r=0 to 40 wt %;

m+n+p+q+r=100 wt %; and x=1 to 100,000;

$$[(A)_m(B)_n(C)_p(E)_r]_x \quad (II)$$

wherein A, B, C, and E are moieties as described above, and where m, n, p, and r of formula (II) are as follows:

m=0 to 90 wt %;

n=0 to 90 wt %;

p=0 to 90 wt %;

r=0.01 to 100 wt %;

m+n+p+r=100 wt %; and x=1 to 100,000; and mixtures thereof.

11. A method for improving smear, smudge and blotting time of an ink-jet ink for ink-jet printing, said ink-jet ink comprising a colorant and a vehicle, said method comprising adding to said ink from about 0.05 wt % to about 10 wt % 2-methyl-1,3-propanediol and from about 0.05 wt % to about 3 wt % methyl pentanediol.

12. The method of claim 11 wherein the methyl pentanediol is 2-methyl-2,4-pentanediol.

13. The method claim 11 wherein the ink comprises from about 2 wt % to about 7 wt % of 2-methyl-1,3-propanediol and from about 0.5 wt % to about 2 wt % of the methyl pentanediol.

14. The method of claim 11 wherein the colorant is a self-dispersing pigment.

15. The method of claim 11 wherein the ink composition further comprises a latex polymer.

16. A method for improving smear, smudge and blotting time of an ink-jet ink for ink-jet printing, said ink-jet ink comprising a pigment and a vehicle, said method comprising ink-jet ink further contains from about 0.05 wt % to about 10 wt % 2-methyl-1,3-propanediol and from about 0.05 wt % to about 3 wt % methyl pentanediol.

17. The method of claim 16 wherein the ink comprises from about 2 wt % to about 7 wt % of 2-methyl-1,3-propanediol and from about 0.5 wt % to about 2 wt % of the methyl pentanediol.

* * * * *